United States Patent [19]

Corominas

[11] Patent Number: 5,269,216
[45] Date of Patent: Dec. 14, 1993

[54] AUTOMATIC MACHINE FOR STERILIZATION AND ASEPTIC PACKING OF MEAT PRODUCTS

[75] Inventor: Narciso L. Corominas, Girona, Spain

[73] Assignee: Metalquimia S.A., Girona, Spain

[21] Appl. No.: 858,007

[22] Filed: Mar. 26, 1992

[30] Foreign Application Priority Data

Mar. 28, 1991 [FR] France .................... 91 04073
Mar. 25, 1992 [ES] Spain ..................... 9200642

[51] Int. Cl.$^5$ .................... A23L 3/00; A23L 3/02; A23L 3/10
[52] U.S. Cl. ..................... 99/356; 53/425; 53/510; 99/470; 99/472; 99/483
[58] Field of Search .................. 99/352, 355, 356, 451, 99/483, 484, 516, 534, 535, 467–472; 452/135, 134, 198; 53/425, 450, 510, 512, 517, 127, 79; 426/392, 412, 414; 141/59, 65

[56] References Cited

U.S. PATENT DOCUMENTS

| Re. 31,513 | 1/1984 | Glen | 99/470 |
| Re. 32,695 | 6/1988 | Nahra et al. | 99/467 |
| 3,603,240 | 9/1971 | McCarthy | 99/356 |
| 3,661,073 | 5/1972 | Schack et al. | 99/533 |
| 3,793,939 | 2/1974 | Wieser et al. | 99/484 |
| 3,809,844 | 5/1974 | Stenstrom | 99/451 |
| 3,874,145 | 4/1975 | Schmidt | 53/510 |
| 4,296,588 | 10/1981 | Vetter | 53/510 |
| 4,885,897 | 12/1989 | Gryouda et al. | 53/432 |
| 4,948,610 | 8/1990 | Goglio | 426/392 |
| 4,968,516 | 11/1990 | Thompson | 99/330 |
| 5,048,404 | 9/1991 | Bushnell et al. | 99/483 |

FOREIGN PATENT DOCUMENTS 2508279 12/1982 European Pat. Off. .
0128610 12/1984 European Pat. Off. .
0230978 5/1987 European Pat. Off. .

*Primary Examiner*—Timothy F. Simone
*Attorney, Agent, or Firm*—Jacobson, Price, Holman & Stern

[57] ABSTRACT

An automatic machine for sterilizing, packing and sealing a meat product includes a first station (1) for sterilizing the meat product surface layer or stratum by submitting it to a thermal shock of high temperature during a very short interval (HTST technique), an apparatus (E) for feeding the meat products to the first station and a further meat product conveying apparatus (0) for withdrawing the meat product from the first station and transferring it to a wrapping position, a second station (2) for wrapping the meat product in a pre-set position including a device (57, 58) for sequentially positioning tubular containers such as bags (65) from a storage area (62) therefor to the wrapping position and opening the inlet of the tubular container for insertion of the meat product therein from the transfer device (0), a device (85, 86, 87, 88, 95) for transferring the filled tubular containers in the open position to a third station (3), and a device at the third station for vacuum sealing of the container. A cover (46) is provided in the first station for assuring aseptic atmosphere for the sterilization at an average temperature from 100° C. to 160° C. at intervals less than 15 seconds. An enclosure (120) is provided for enclosing the three stations in a laminar upright flow chamber to assure the purity of the atmosphere in which the sterilization is carried out.

26 Claims, 15 Drawing Sheets

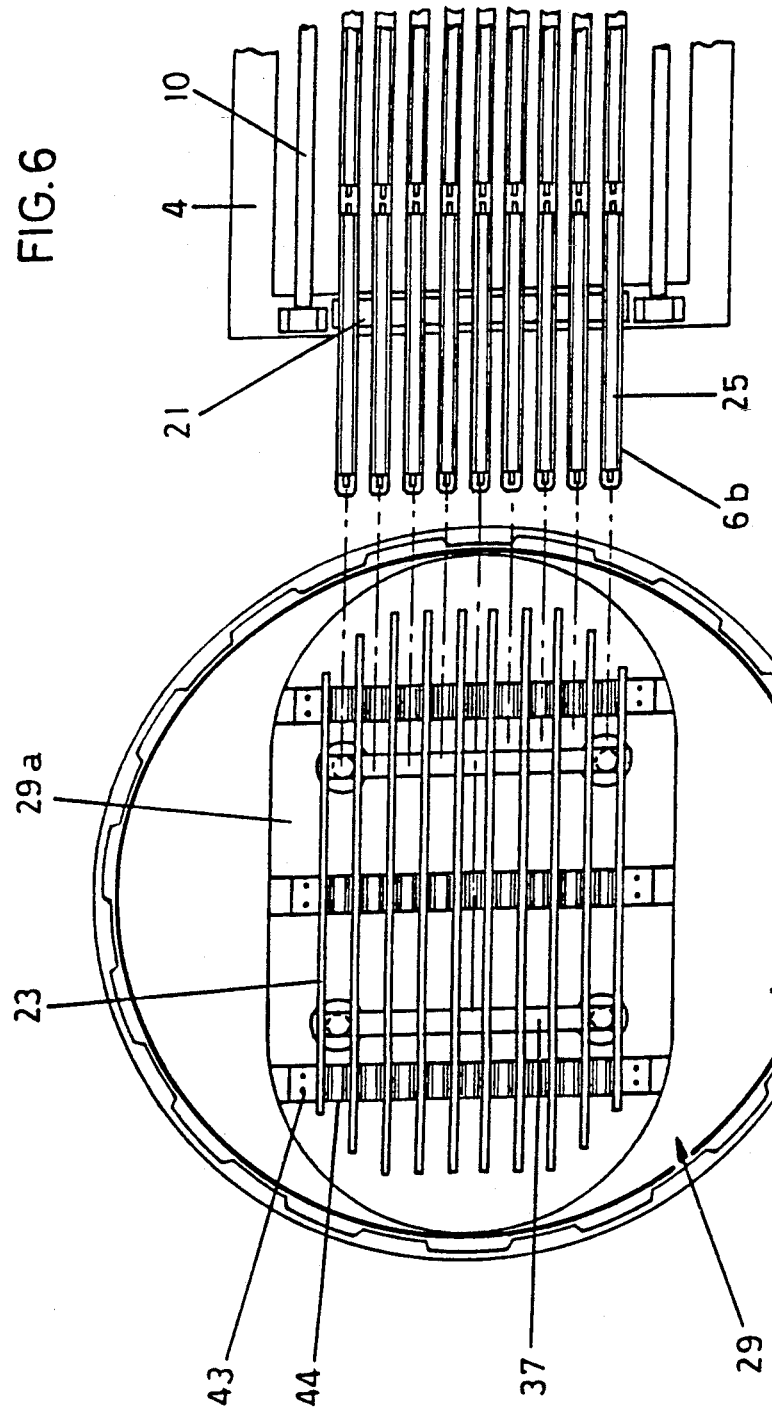
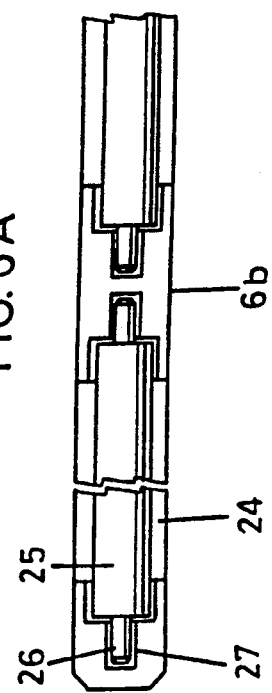
FIG. 6
FIG. 6A

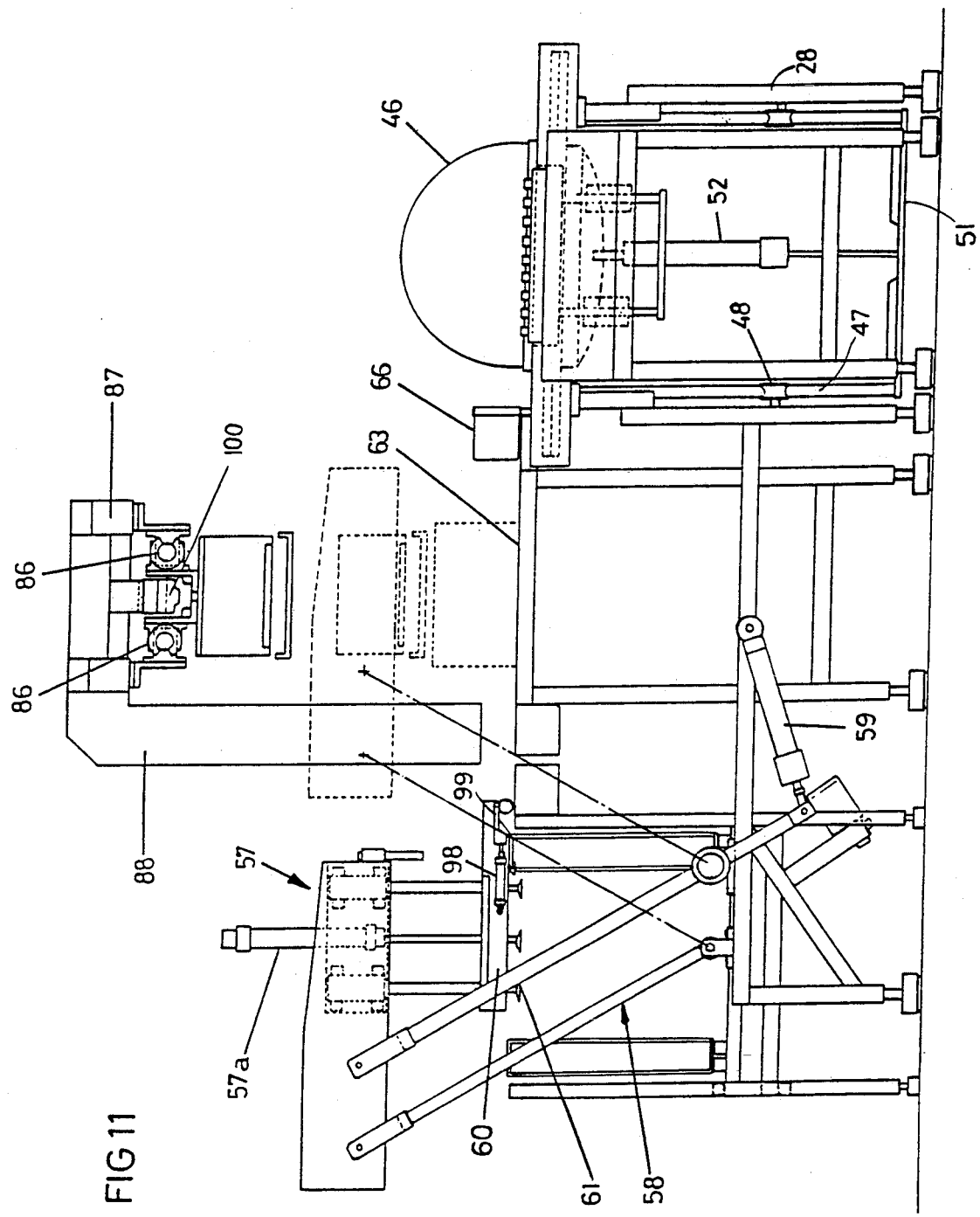

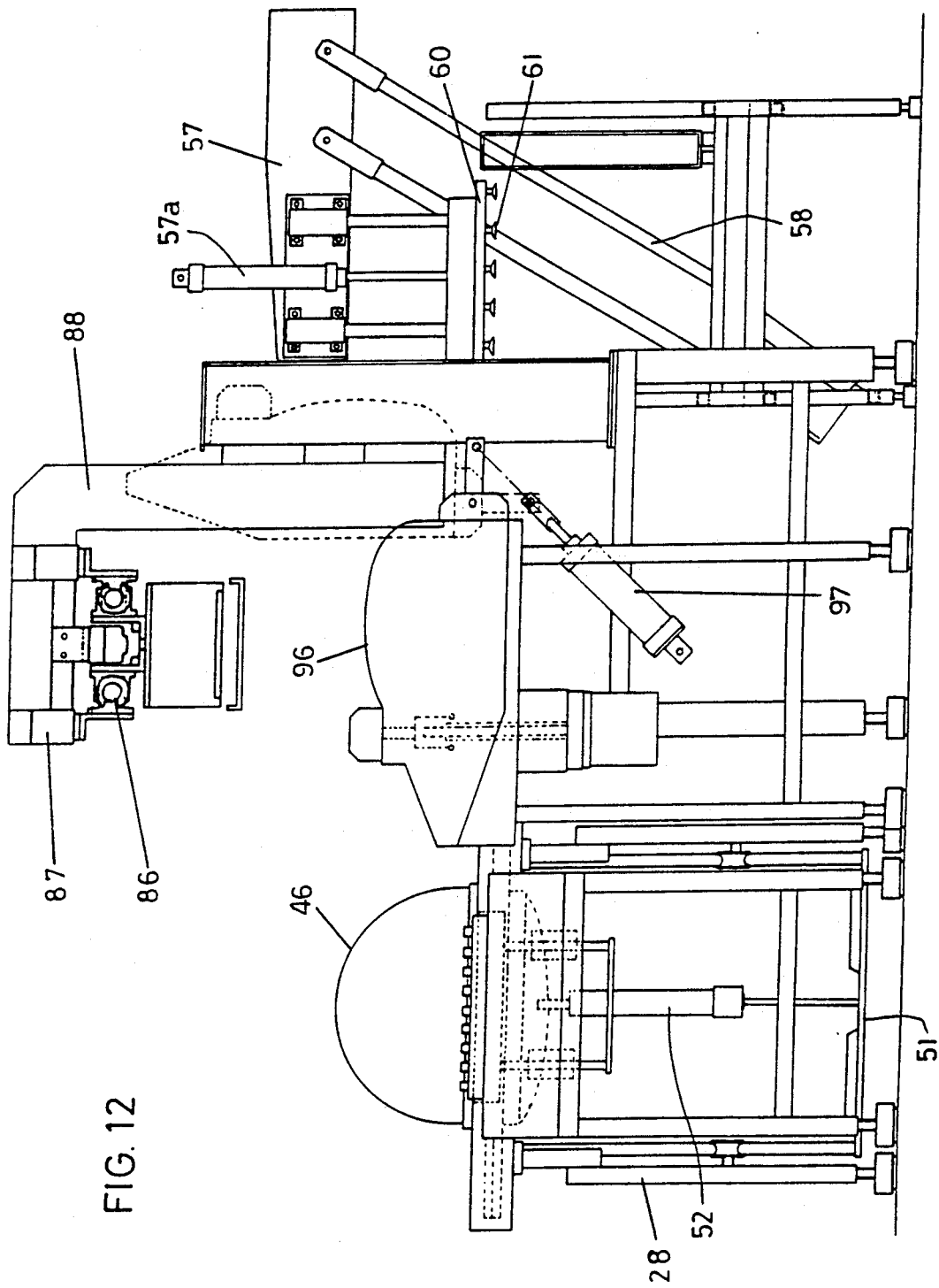

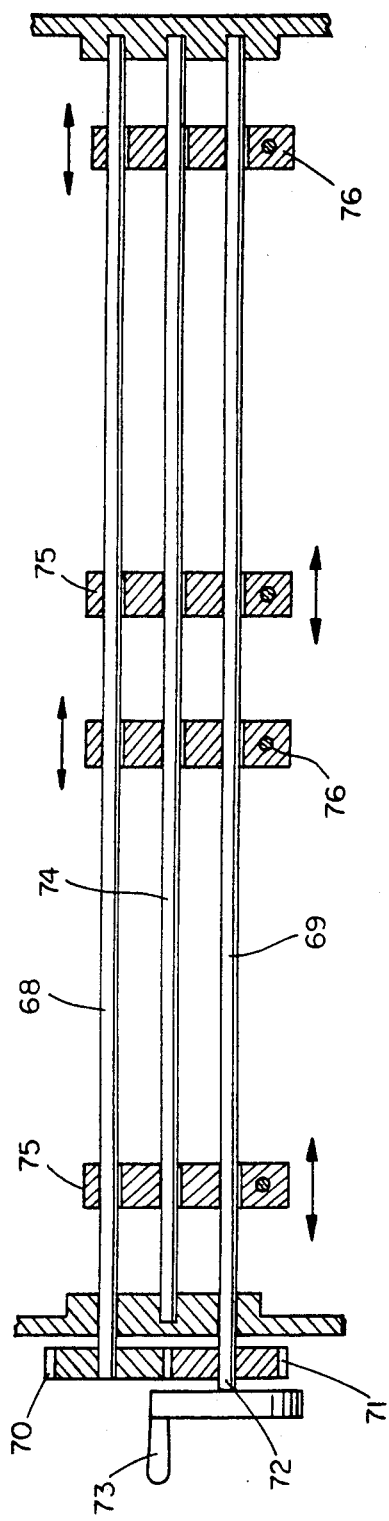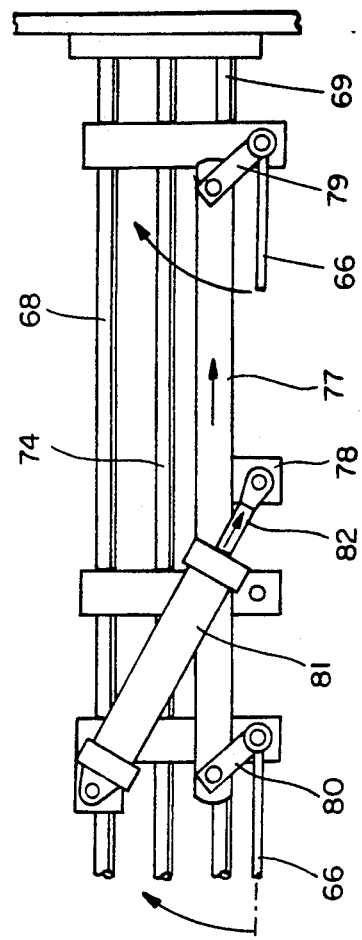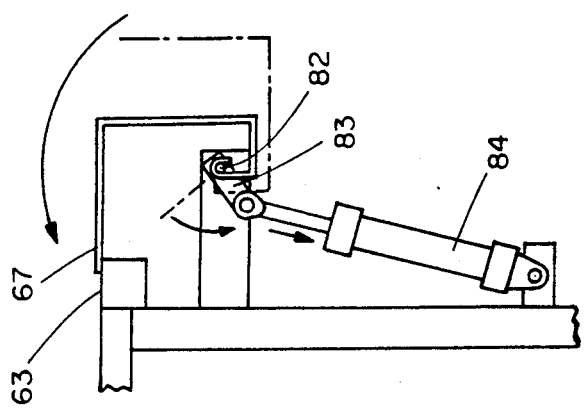

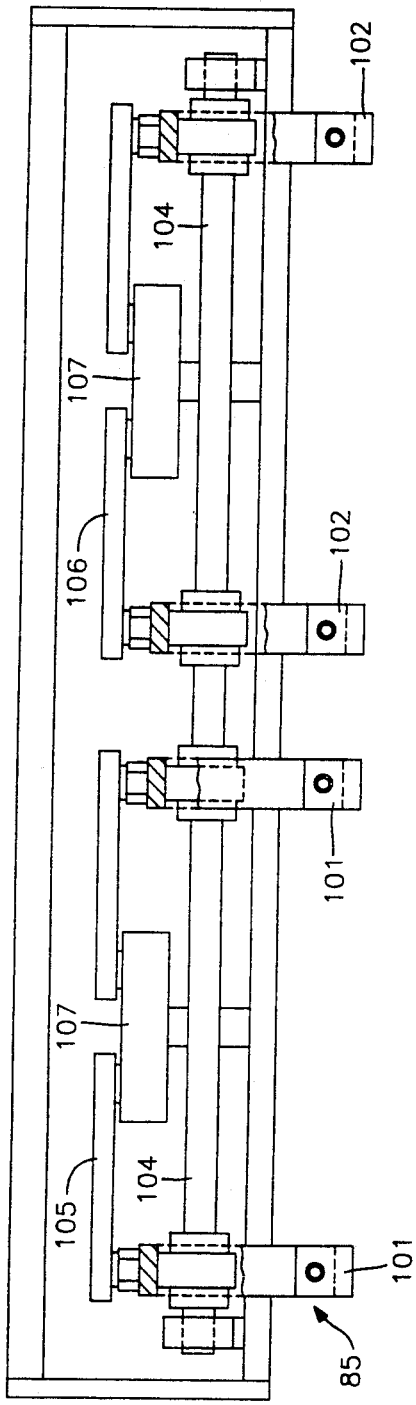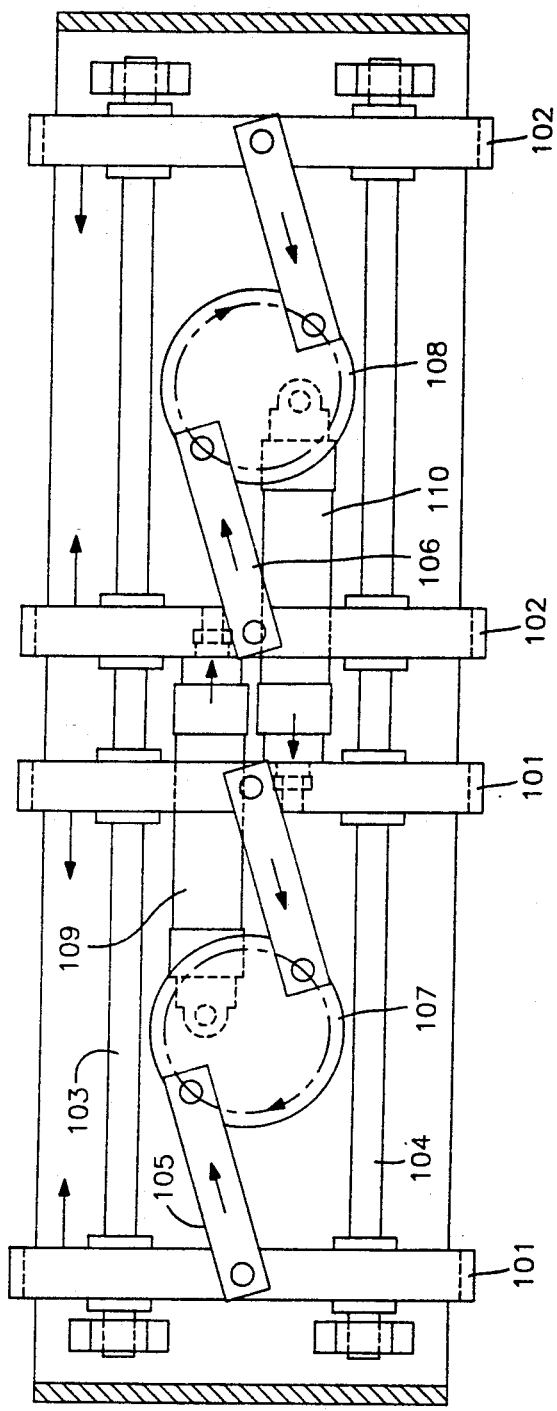

AUTOMATIC MACHINE FOR STERILIZATION AND ASEPTIC PACKING OF MEAT PRODUCTS

BACKGROUND OF THE INVENTION

This invention relates to a machine for processing perishable meat products, such as a piece of ham or shoulder meat, which having sustained deboning, additives and/or ingredients injecting (auxiliary to namely coloration and taste), tenderizing, massing and curing operations, is later on submitted to a cooking-pasteurization stage, inside a rigid or semi-rigid mold protected by a continuous (open bag) wrapping, at room temperature or in vacuum, after which stage it is demolded and taken apart from that wrapping to eliminate fluids exuded during the cooking-pasteurization process and for a suitable conditioning of the product surface, being finally repacked, advantageously in vacuum in tightly sealed conditions by means of different sealing means (stapling, heat-sealing etc.).

The above procedure is mainly used to obtain high quality products, in which an exudation during the cooking-pasteurization stage is sought, in order to achieve a best development of flavor and aroma. The fact that it is not necessary to prevent the juice exudation during the cooking-pasteurization, also means a lesser mechanical treatment of the meat piece during the process, which will allow to obtain a product with a best appearance, similar to the one obtained through craftsmanship.

On the other hand eliminating the juices is essential, mainly for suitable preservation of the packed product.

Bearing in mind that after meat product cooking-pasteurization and when opening the wrapping (bag), unavoidable product surface recontamination arises, after the final repacking a pasteurization or sterilization stage is required for correct preservation of the product. In this point, the further product heating once its final packing is achieved, was up to now the most used method to significantly extend the preservation of the cooked-pasteurized products, without requiring to have recourse to other treatments, such as chemical or radiations after final packing.

For such purpose, up to this time, several equipments were developed which generally include a great volume and high cost, with dilated operative times.

We can mention, namely, the use of autoclaves of nonstop operation. One equipment existing in the market includes three columns arranged one after the other for the heating-sterilization-cooling stages. The molds are automatically entered inside containing devices which pass conveyed by conveying means through the columns, the sterilizing medium being a vapour and air mixture, depending on the case.

Another autoclave of the above type includes a horizontally positioned boiler in which the containers enter through a conveying chain and a gate, either or not submitted to a rotary movement, to be pre-heated, sterilized and pre-cooled. Later on, and already outside the boiler, they finish their cooling without pressure. The sterilizing medium is water or a vapor and air mixture.

An alternative equipment includes an oven in which the products are introduced and which, after a certain period of time of heat contribution and further cooling, is unloaded. This process makes continuous work difficult, as it demands loading and unloading operations of the working premise.

As can be seen, the above processes all require in addition to a long heating time, necessarily a significant cooling time.

On the other hand, the sterilization or pasteurization stage, in addition to the above drawbacks, and mainly due to the long time of process with heat contribution, produces in a number of cases an impairment of the meat piece surface color by degradating the meat pigment, modifying therefore the appearance of the end product obtained.

BRIEF SUMMARY OF THE INVENTION

An object of the invention is to provide a machine produces a significant decrease of the process time with respect to the state of the art disclosed, and a guaranty of a long packed product (meat piece) preservation time, due to an effective elimination of the microbial flora from the product recontaminated area, once the post-cooking-pasteurization stage to eliminate exudate and condition the surface of said meat piece is ended, with an utmost preservation of the organonleptic properties of the product involved.

The operative conditions of the procedure disclosed allows in addition that the plant has a smaller and less complex volume, and makes possible a nonstop treatment which encompasses the product sterilization and final packing under aseptic conditions.

The invention is based on applying a HTST (high temperature short time) sterilization technique, i.e. it consists in producing a high temperature thermal shock (of at least 100-160 degrees C.), of a very short duration, to which the whole product surface is submitted after the re-conditioning stage (meat piece exudate elimination and surface conditioning) after the post-cooking-pasteurization stage, and which is followed by a final vacuum or (controlled) modified atmosphere packing, in aseptic conditions, all being achieved in a nonstop process.

The heat exchange process associated with the HTST sterilization technique because of the nature of the equipment used was only applied up to now to liquids or to liquids which contained small particles. When the size of the particles is over a few mm the effectiveness of the sterilization method is lost as the particle thermal center is not reached, in addition to requiring complicated product conveying means through the treatment area.

However, in accordance with the machine of this invention, the HTST technique, has being found applicable and effective for meat pieces. submitting them previously to a cooking-pasteurizing, i.e. it can be used in the mentioned re-packing stage, preceding the properly called packing which would be achieved later on in aseptic conditions, because in the mentioned prior re-conditioning stage (meat piece exudate elimination and surface conditioning), only a superficial contamination will occur, i.e. limited to the stratum immediately close to the external face of the meat piece. This way, a HTST technique treatment, is useful and feasible, as it fully affects the product external layer, achieving, in addition a much more effective result as for microorganisms impairment and/or growth inhibition thereof, than the one resulting from applying the traditional heat contribution techniques with the meat piece located inside a tightly closed packing, obtaining a self-stable product fit for a longer duration preservation than that provided by traditional techniques and procedures and with a minimum organoleptic degradation.

In addition, as the high temperature thermal treatment, according to the HTST technique, only affects the meat piece surface layer or stratum, cooling the piece will occur faster, allowing the machine to operate in a nonstop manner to the product final packing, in aseptic conditions.

Therefore, the machine operates basically in the following steps:

a) meat piece pasteurization by cooking inside rigid or semi rigid molds or containers, advantageously protected by a wrapping means, open or closed, until it reaches a temperature in the thermal center of the meat piece of 65 to 75 Degrees C., and during an interval of time sufficient for a suitable pasteurization of the product which guaranties heating effects (value F 10° C.-70° C.) over 30 measured at the piece thermal center;

b) withdrawal of the pasteurization meat piece from its wrapping means, exuded fluids elimination and product external surface conditioning;

c) sterilization of the meat piece surface layer or stratum, submitting it to a thermal shock of high temperature during a very short interval, in accordance with a HTST technique (high temperature short time) operating at room temperature conditions directly in contact with the meat piece surface over 100° C. and the time of treatment by piece being under 15 second;

d) product re-packing in aseptic conditions, c) and d) being carried out by automatic equipment nonstop, without organoleptic and nutritious conditions impairment.

The machine for performing operations c) and d) above according to the invention includes:

means to introduce, at least, a meat piece, after sustaining above treatments, inside a first station for surface sterilization, the first station including a chamber that can be tightly closed;

means for taking, holding in a stable position inside said first station, and to release said meat piece;

means for tight sealing of the chamber of the first station, once the meat piece has been introduced therein, and for opening the chamber after a pre-set time required for a meat piece surface sterilization;

means for providing heat inside the enclosure of the first station, in position of tight sealing, until the internal atmosphere reaches an average temperature ranging from 100 to 160 degrees C., with an interval of treatment time below 15 seconds;

means to withdraw the sterilized meat piece from inside the chamber of the first treatment station, and to transfer the piece to a second station for the wrapping thereof where it is placed in a pre-set position;

means for sequentially positioning tubular containers such as bags, from a storage area thereof, up to a position in the second station in which its inlet remains adjacent and facing the meat piece position in the second station;

means for opening of the inlet the tubular container and keeping it open, and fixing, at least two walls of the bag;

means to transfer by pushing the meat pieces inside the containers with their inlets open;

means to grip the filled containers, with their inlets still open and to move them, in the attained conditions up to a third station for vacuum sealing thereof;

the three stations and the entire means remaining located except the meat piece entering means to the first station, inside a wrapping enclosure provided with an ultrafiltrate air impulsion module, constituting a laminar upright flow chamber, to guaranty the asepsis of the atmosphere in which the operations are carried out, and in the means being synchronized for a sequential cyclic performance of the operations in the different stations.

BRIEF DESCRIPTION OF THE DRAWINGS

The above and other objects, advantages and features of the present invention will become more apparent from the following description of certain preferred embodiments thereof with reference to the accompanying drawings wherein

FIG. 6 is a top plan view of the means to hold the meat piece inside the chamber of the first station and the means to withdraw the meat piece;

FIG. 5A shows a detail of the supporting floor for the meat piece to withdraw it from the first station;

FIG. 10 is a top plan view of the revolving means used to support and guide the surrounding ring;

FIGS. 11 and 12 are side elevational views of the machine unit taken according to the direction of the arrows A and B of FIG. 3, respectively;

FIGS. 17 and 18 are top plan and side elevational views, respectively which show the mechanism for operating blades;

FIG. 19, is an elevational view of the corresponding mechanism related to central blades to keep the bag open, clamping its inlet edges when placed on the second station in order to facilitate the related meat piece entering inside thereof;

FIG. 20 is an elevational view of the mechanism for driving the clamps to grip the bags with the meat pieces to transfer them from the second station to the third station FIG. 21 is a bottom plan view of FIG. 20.

DETAILED DESCRIPTION

Figure 1:
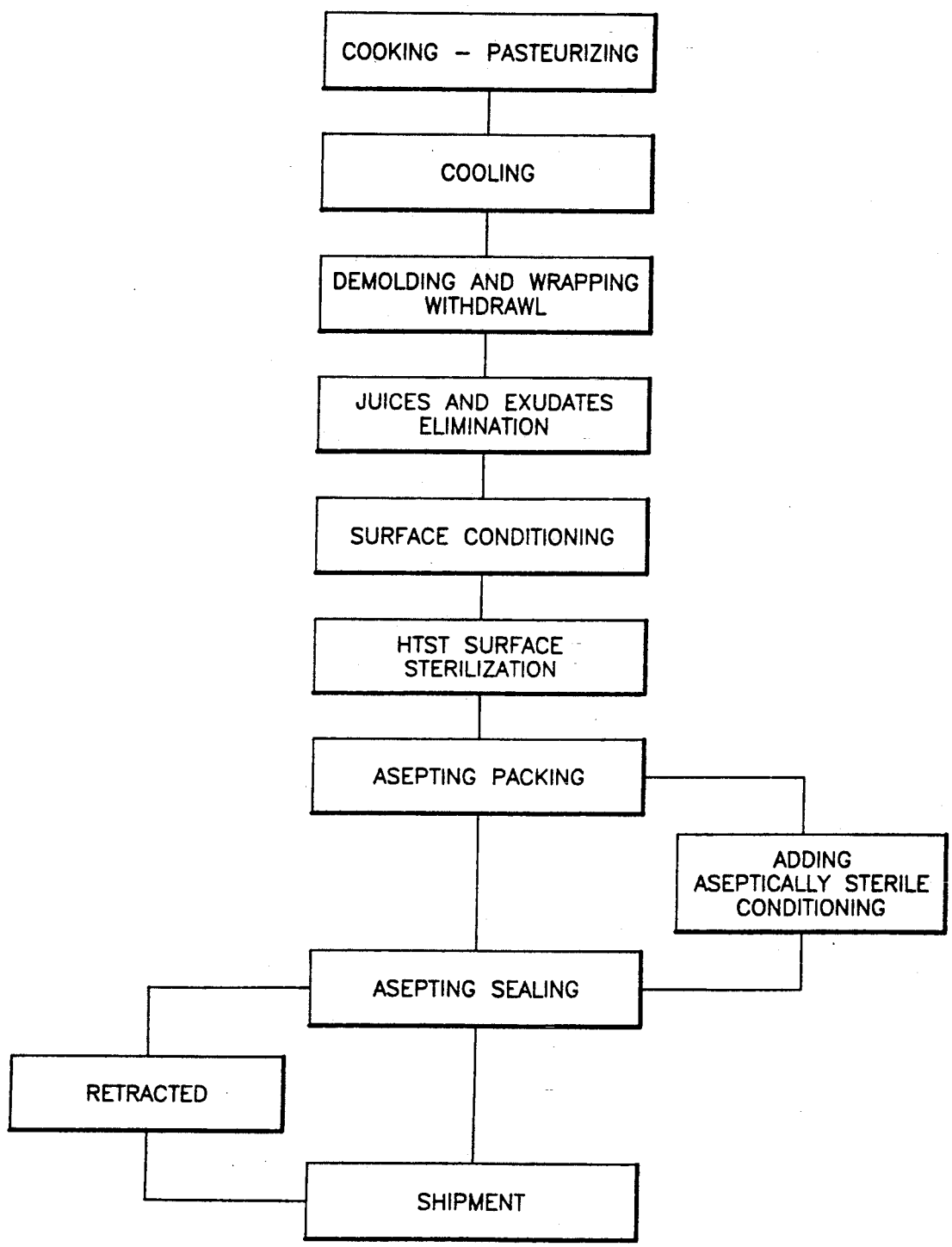
FIG. 1 is an explanatory diagram of the different operational procedures in accordance with the invention.
Figure 2:
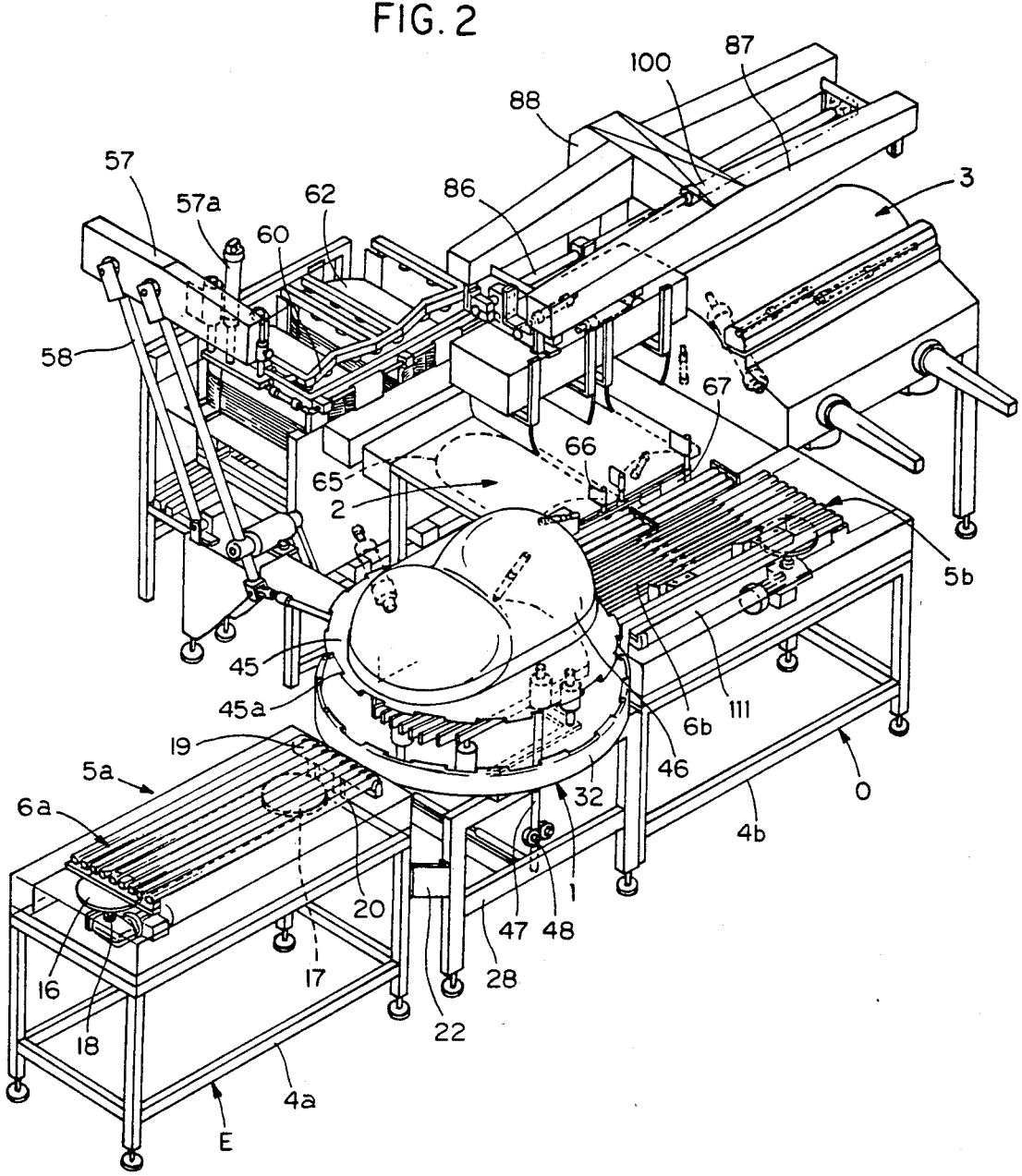
FIG. 2 is a general perspective view of the machine of the invention, without its upright laminar flow wrapping cabin, showing the three operation stations composing it.

Referring to above figures, and namely FIG. 2, the machine of the invention comprises essentially three stations: sterilizing station 1, a bag filling station 2, and a sealing station 3 for the bags including a meat piece.

At both sides of the first station 1 there exists units to enter the meat piece inside the station, and for withdrawing it, respectively, generally designated with the letters E and O, which essentially comprise frames 4a, 4b and a movable supporting floor 5a, 5b formed by a plurality of strips 6a, 6b linked to a conveying truck constituted by a transversal joist 7, side plates 8 supporting wheels 9 which surround horizontal guides 10, fixed to frames 4a and 4b, respectively. Said joist 7 has an inverted U shaped cross-section, and inside such U wheels 11 are arranged, linked to a T-shaped support 12 which is fixed by one of its ends by a C-shaped part 13 to a link 14 of a chain 15, which extends between two coplanar toothed wheels 16 and 17, one of them driven and the other controlled by a motoreducer 18. Each strip set 6 remains locked, by one of its ends, to respective joist 7 and is supported, by its other end on a support 19 fixed by a strut 20 to the frame 4a, 4b, said support including guides 21.

Said sets E and O remain linked to the central station by rigid locking plates 22 in order to guaranty a suitable aligning of the strips to allow them to interpenetrate with respect to a grid 23 of strips installed inside the chamber of station 1.

The set O, has as single difference from set E that enters the meat piece, in that, as shown in FIG. 6 and detail 6A, the strips 6b have offset areas 24 to lodge cylinders 25 ending in shifts 26 which are socketed in end notches 27 of each offset, allowing its free rotation, so forming a rotatable floor.

Figure 10:
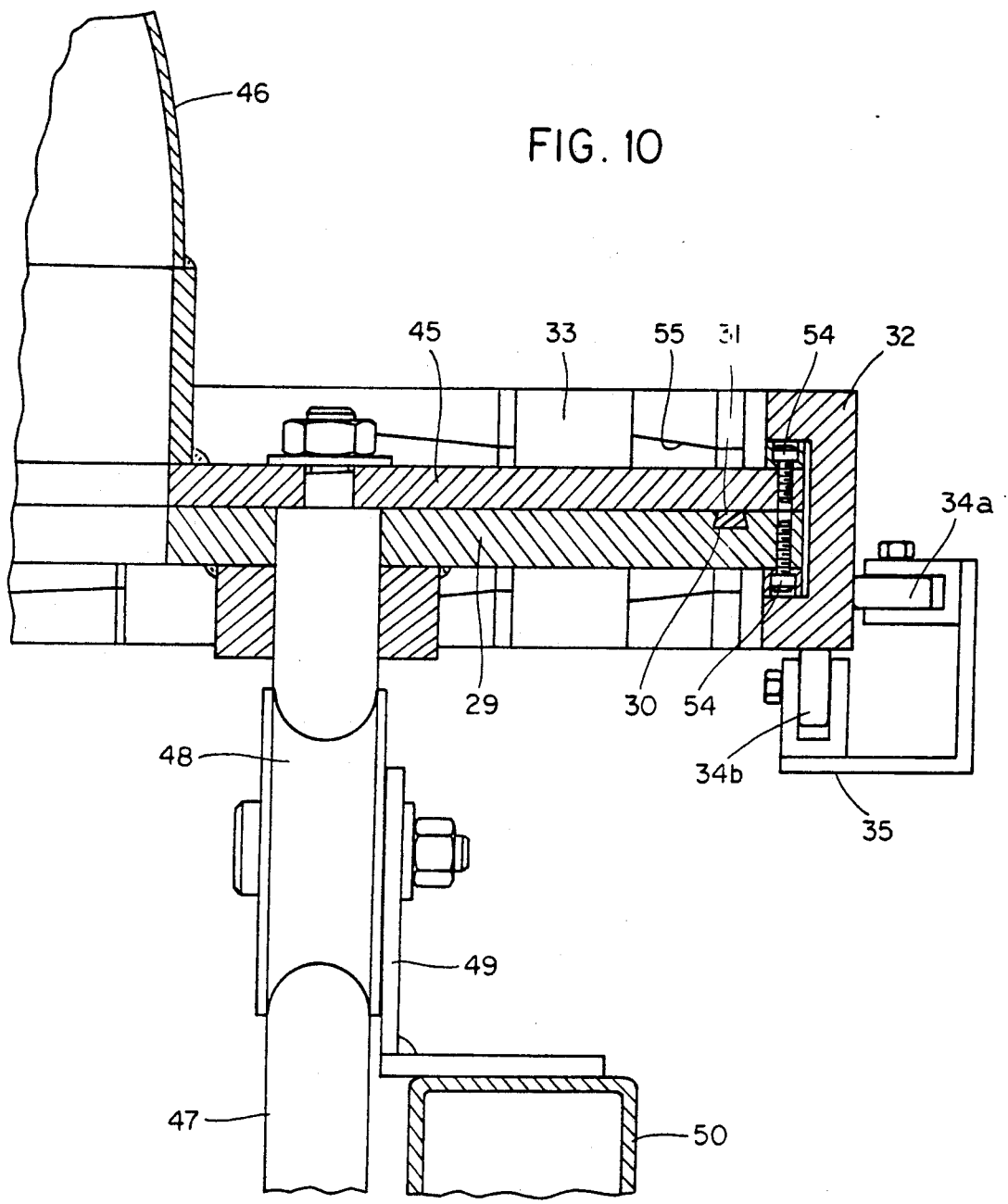
FIG. 10 is a detail in larger scale of part of FIG. 9 showing, the means to rotatable support the surrounding ring as well as the tight closing means between the bottom disc and the plate holding the cover.
Figure 10A:
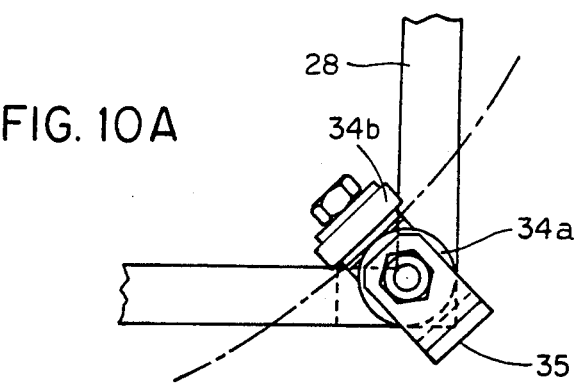

First station 1 comprises a bedframe 28 on which is defined a receptacle including a fixed disc 29 as the bottom, with a basin 29a on its periphery and a circumferential groove 30 close to its edge where a sealing gasket 31 is (see FIG. 10). The disc 29 is surrounded by a ring 32 of C-shaped section inwardly oriented, rotatably movable, whose annular ribs loosely clasp the periphery of disc 29 and having a series of equally spaced cutouts 33, equivalent to those 29b existing on disc 29, to allow its positioning, ring 32 resting (see FIGS. 10 and 10A) on a set of wheels 34a 34b, which are mounted on a support 35 integral with the bedframe 28. Ring 32 is linked to an hydraulic cylinder 36 with its body locked to the bedframe 28 and its stem linked to the ring 32 external side wall.

Figure 3:
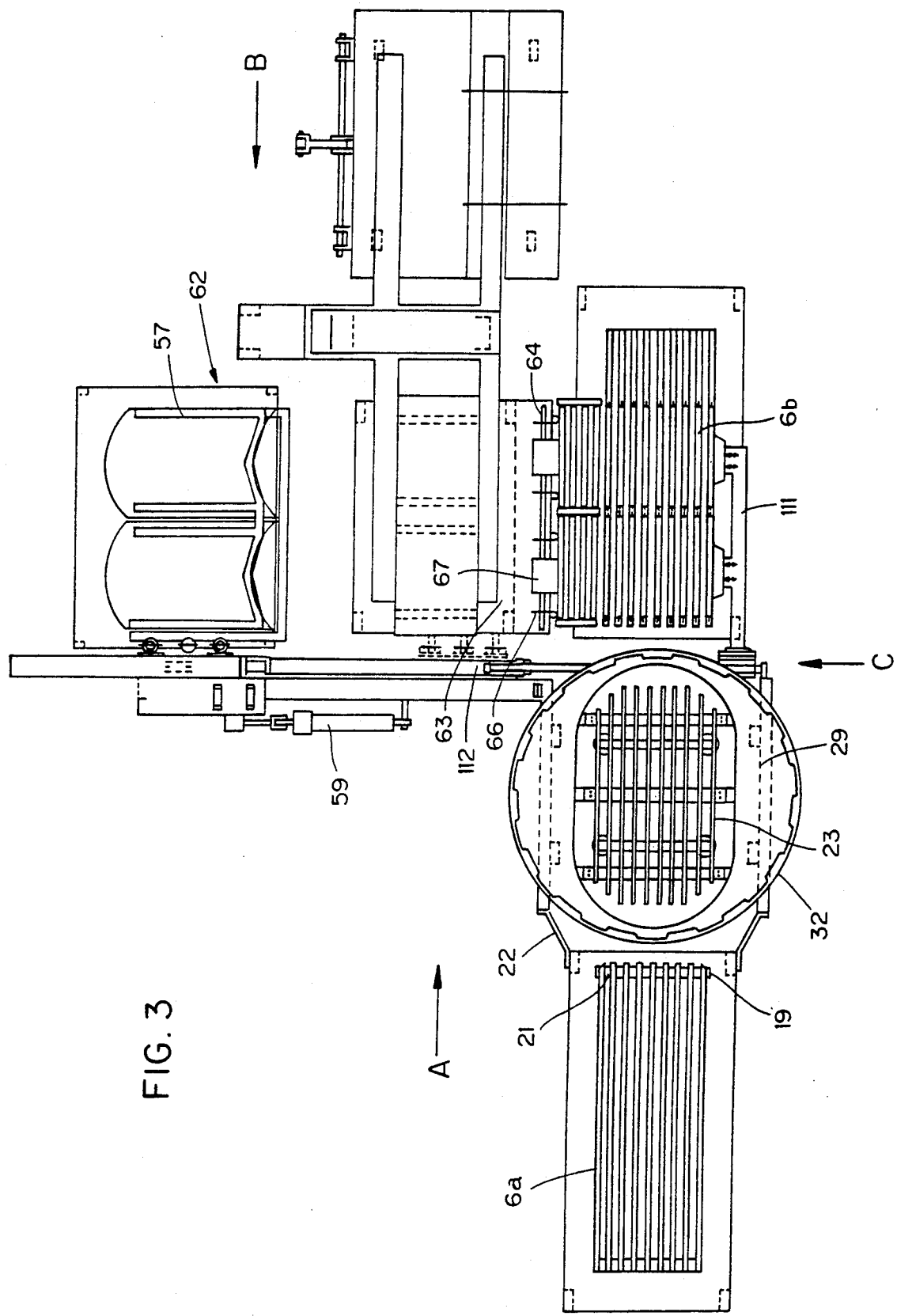
FIG. 3, is a top plan view of the machine unit of FIG. 1.
Figure 4:
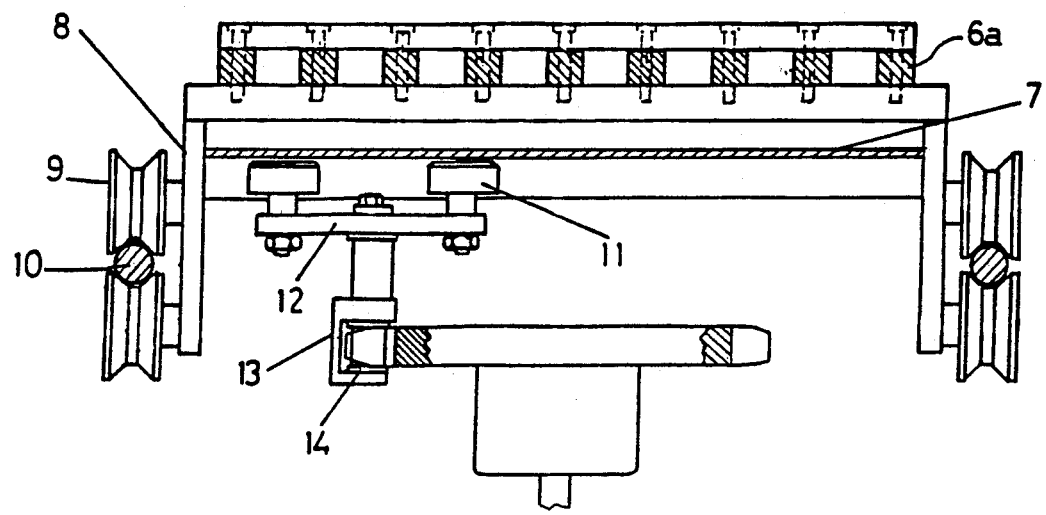
FIG. 4 is a side elevational view, partially in cross section showing the supporting floor conveying means to enter and withdraw the meat piece with respect to the first station.
Figure 5:
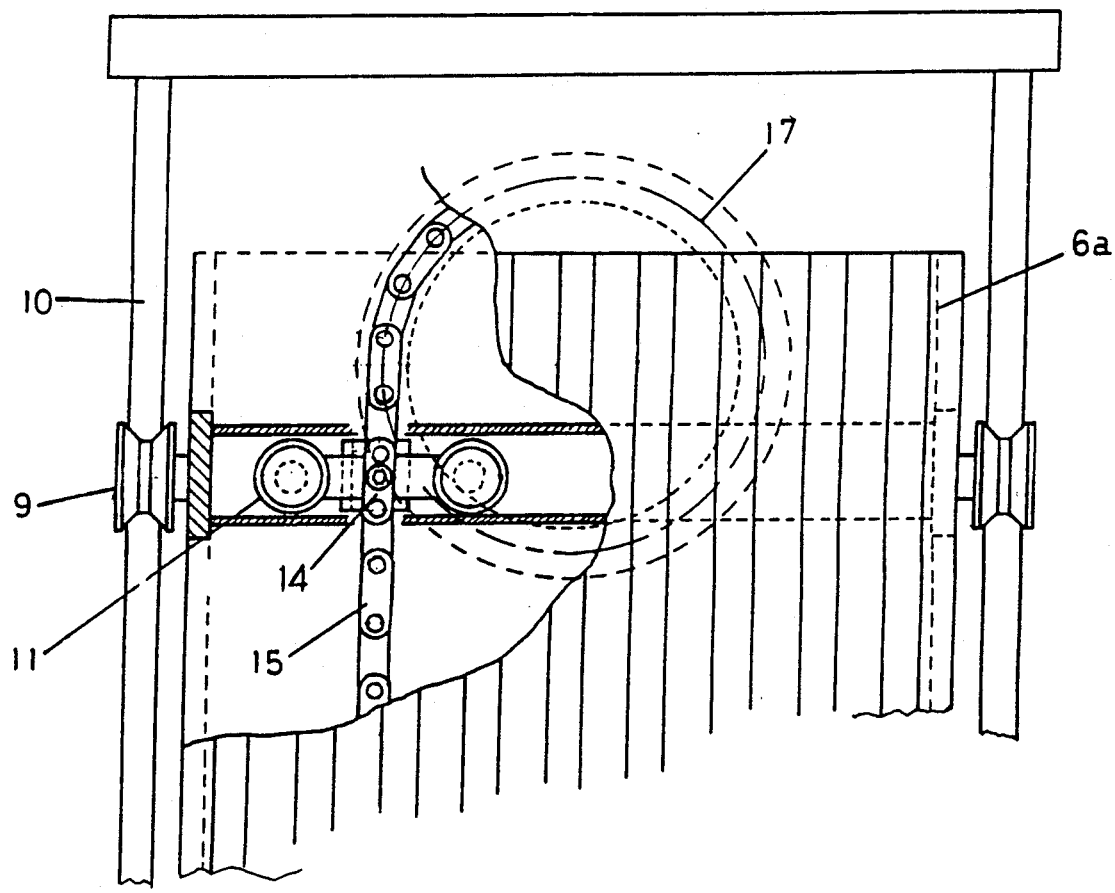
FIG. 5 is a top plan view partially in cross section, of part of the conveying means of FIG. 4.
Figure 7:
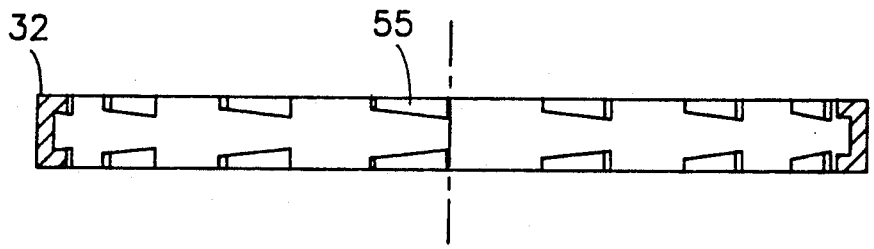
FIG. 7 is a side elevational view in cross section of the ring constituting the first station chamber side wall.
Figure 8:
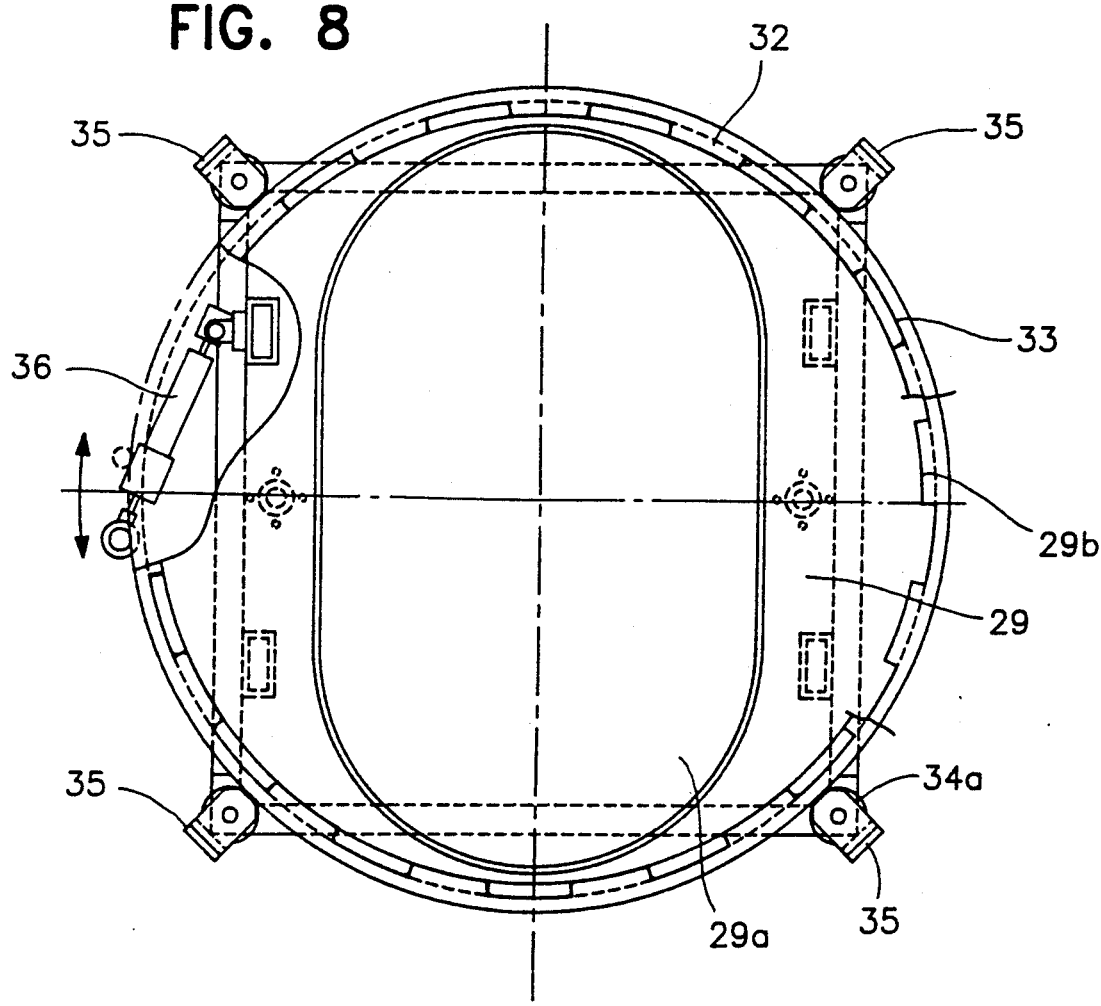
FIG. 8 is a top plan view showing the driving means for rotating the ring and one part of the periphery of the bottom disc, through a cut out of the annular flange of the rings.
Figure 9:
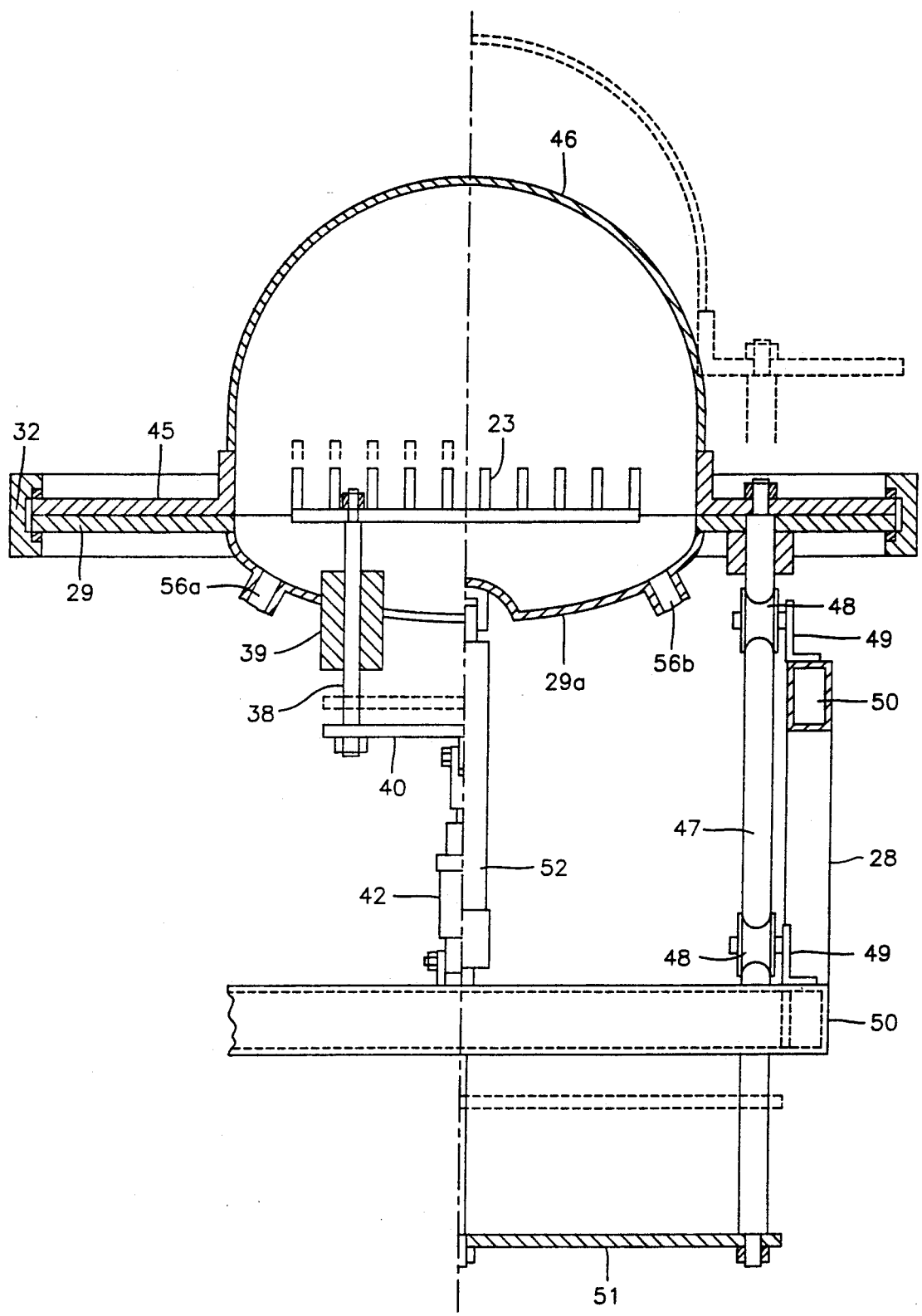
FIG. 9 is an enlarged side elevational view partially in cross section showing the means to move the meat piece supporting grid (left half side) and the chamber sealing cover (right half side) forming the first station.

Above the bottom 29 there exists a supporting floor for the meat piece, formed by a grid 23 (see FIGS. 3,6 and 8) whose bars are locked to two cross sectional profiles 37 which in turn remain linked to both pairs of stems 38 guided by sockets 39 fixed on a basin-shaped center portion 29a of the disc 29. The stems 39 are joined to each other, in pairs, by means of profiles 40 which, in turn, remain linked by a cross sectional profile 41 (see FIG. 13) forming an H which remains joined to a stem of a fluid dynamic actuator 42 with an upright stem.

Integral with the bottom 29 of the receptacle there exists three other cross sectional profiles 44 whereon are arranged U-shaped profile parts 44, of a low friction coefficient material such as Teflon, acting as guides for strips 6a and 6b of the entering and extracting floors 5a and 5b.

First station 1 comprises an upper plate 45 which is topped at its center portion at a double-dome-shaped covering part 46. The plate 45 is integral with two upright stems 47, which in turn are guided by sets of pulleys 48 mounted on supports 49 integral with joists 50 of the bedframe 28. The stems 47 are joined at their lower parts by a bar 51 which is connected to a second fluid dynamic actuator element 52.

The plate 45 has a series of peripheral cut outs 45a equivalent to cut outs 29b on the periphery of the fixed disc 29, and on the protruding ribs there is, detachably locked by their two faces, wedge-shaped in circumference segment parts 54 which correspond to wedge-shaped profiles 55 defined on the internal higher and lower faces, of the C-shaped profile of the surrounding ring 32.

On the other side, the means to provide heat inside the chamber of first station 1 comprise nozzles 56a and 56b to supply and suck high temperature and pressure vapor.

Second station 2 (see FIG. 11) comprises a tilting head 57 by means of arms 58 rotatably articulated and driven by fluid dynamic cylinder 59. Head 57 includes an overhanging plane 60 provided with a series of sucking pads 61 to grip at least two bags 65 each time, from a warehouse 62 of stacked bags 65, and for moving them onto horizontal floor 63, wherein there exists a transversal slot 64 (see FIG. 3), associated with vacuum generating means to retain a second face, opposite to the first one, of the bag 65 and blades 66 and 67 to lock the side parts and the lower edge of the bag inlet superposed on the table 63, which remains coplanar with the supporting floor 5b of the meat piece withdrawing means.

Tilting head 57 comprises a fluid dynamic actuator 57a providing a vertical displacement, in order to take the bags 65 from the warehouse, and a cylinder 98 to actuate blades 99 in order to hold the upper edge of the bag inlet.

FIGS. 17 and 18 show the mechanism to drive the side blades 66 which includes a set of two spindles 68 and 69 each of them ending in toothed wheels 70, 71 geared to each other and one of them holding a shaft 72 with a driving crank 73. Associated with the spindles and guided by an intermediate guide 74, parallel to the spindles, are arranged pairs of sliding supports, 75 and 76, with holes threaded to one of the spindles and merely slidably engaging the other spindle, related two by two with bars 77 housed in rotating levers 79, 80 mounted on sliding supports 75, 76. The stem 82 of a fluid dynamic cylinder 81 is articulated to a lug 78 of bars 77 and said cylinder is integral with one of the sliding supports, in such a way that when cylinder 81 acts, a coordinated rotation of the levers 79, 80 and through it of the lateral blades 66 occurs. The mechanism of the spindle allows to suitably position the side parts depending on the width of the bag. The sliding supports 75 hold the blades of one of the sides of the two bags and the supports 76 the two blades of the other side.

FIG. 19 shows the means to drive the blades 67 designed to hold the bag lower edge which consist of L-shaped plates locked by one of their ends to a shaft 82 which is rotated by a lever 83 connected to a pneumatic cylinder 84 whereby one of the L-shaped plates of blade 67 can be superposed, after a 90-degree rotation, on floor 63.

In order to transfer the meat pieces from second supporting floor 5b onto the floor 63, pushing means are employed consisting of L-shaped profile 111 with one of its arms parallel and superimposed to the strip 6b and rotatable cylinders 25, and the second arm linked to the stem of a fluid dynamic actuator 112.

Figure 16:
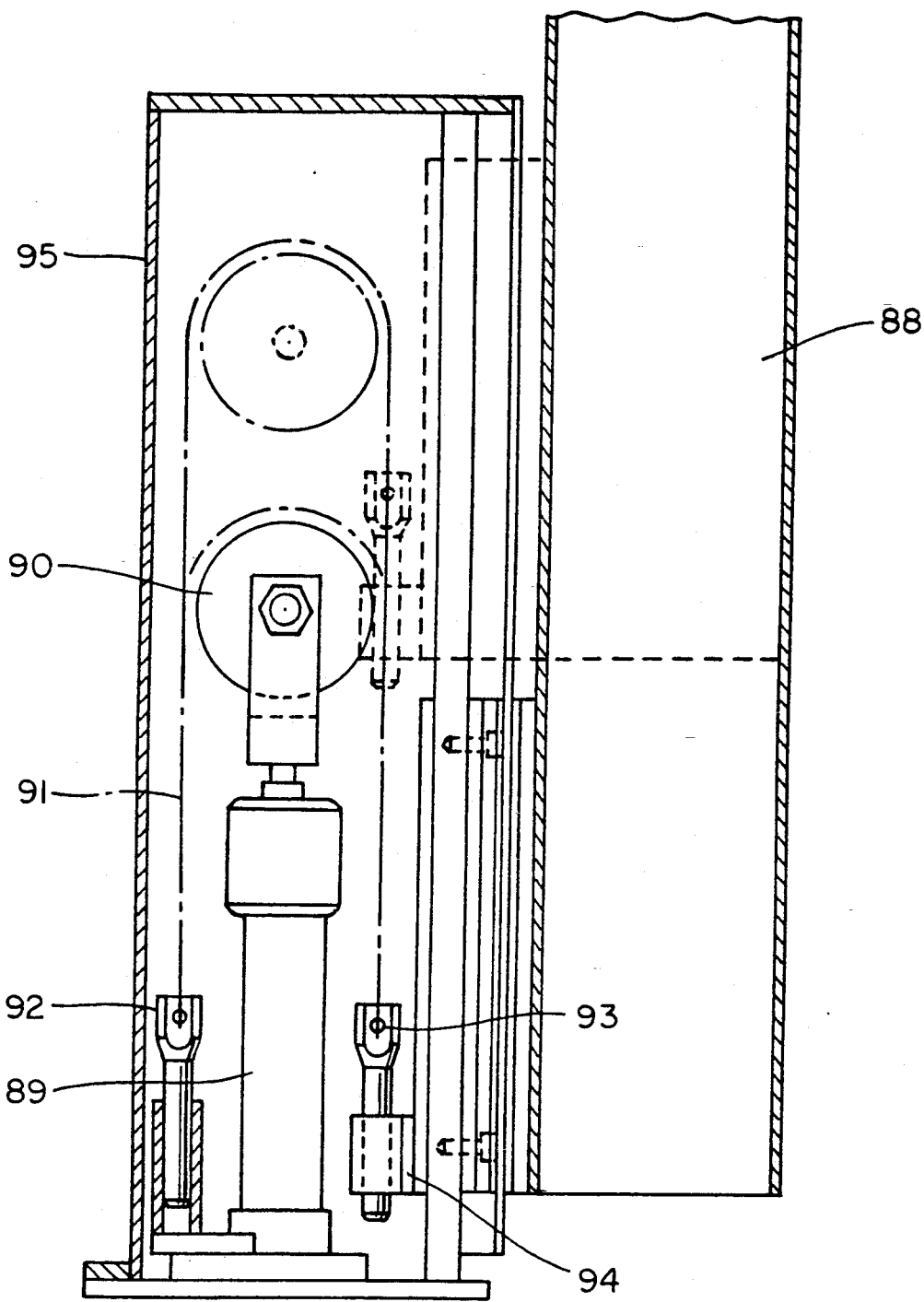
FIG. 16 is a cross-sectional view of part of FIG. 15 showing the means for lifting the unit of FIGS. 14 and 15.

The means for moving the wrapped pieces up to the third station 3 comprise clamps 85 mounted for lengthwise displacement along guides 86 of a horizontal overhanging arm 87 associated with a column 88 and means for lifting and lowering column 88 as shown in FIG. 16.

The lifting means (FIG. 16) comprise an upright hydraulic cylinder 89 having mounted at the end of the stem thereof a pulley 90 around which a chain 91 extends, locked by one of its ends to a fixed point 92 and connected by its other end 93 to a support 94 uprightly guided inside a static upright support 95.

The lengthwise movement of the clamps 85 along the arm 86 is carried out by a fluid dynamic cylinder 100 connected to clamps 85.

The containers sealing station 3 is of a conventional type and it is only emphasized that when the bag linearly moves with the product, when leaving the bags in the recess, provided with a cover 96 moved by a cylinder 97, the bags are always left in a pre-set position to make the sealing means operative.

Figure 13:
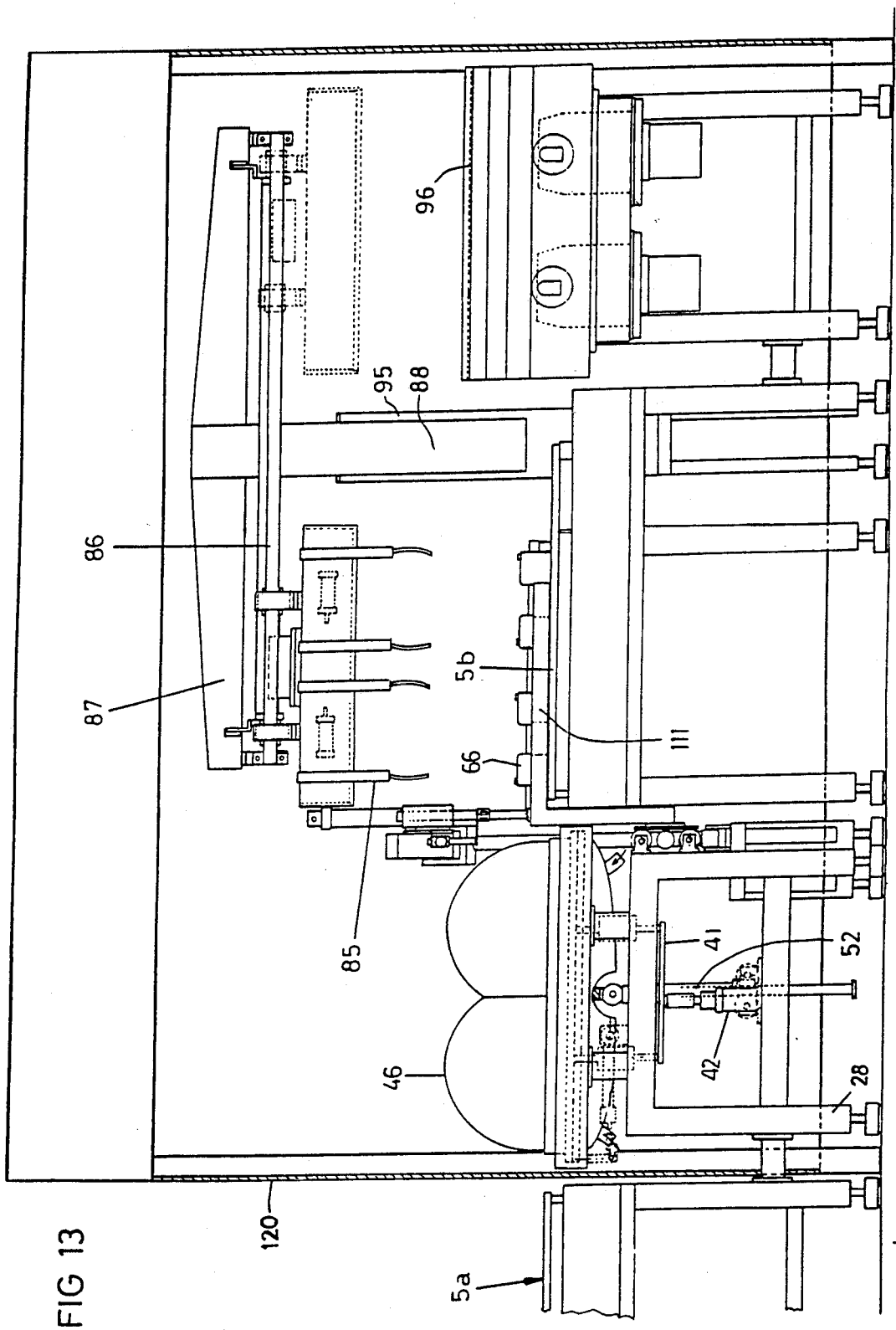
FIG. 13 is an elevational view taken according to the direction of the arrow C of FIG. 3; .
Figure 15:
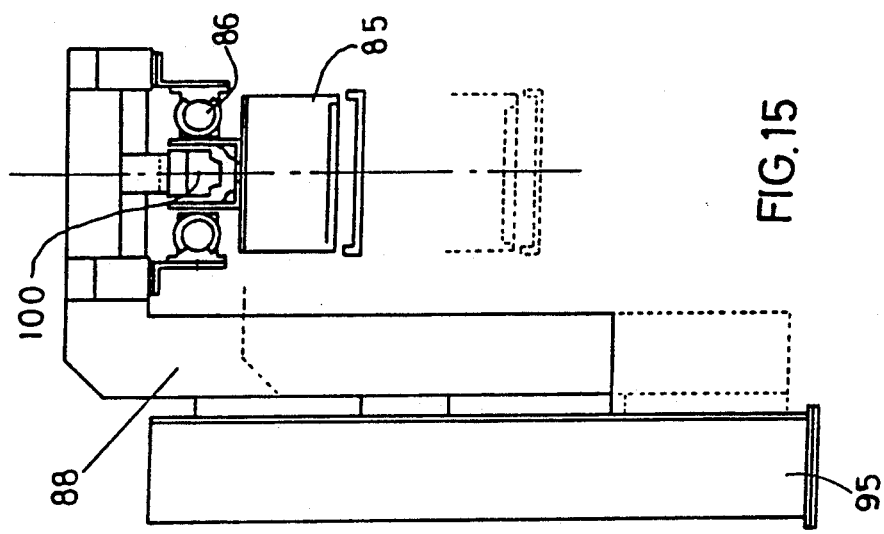
FIG. 15 is a left side view of FIG. 14.
Figure 14:
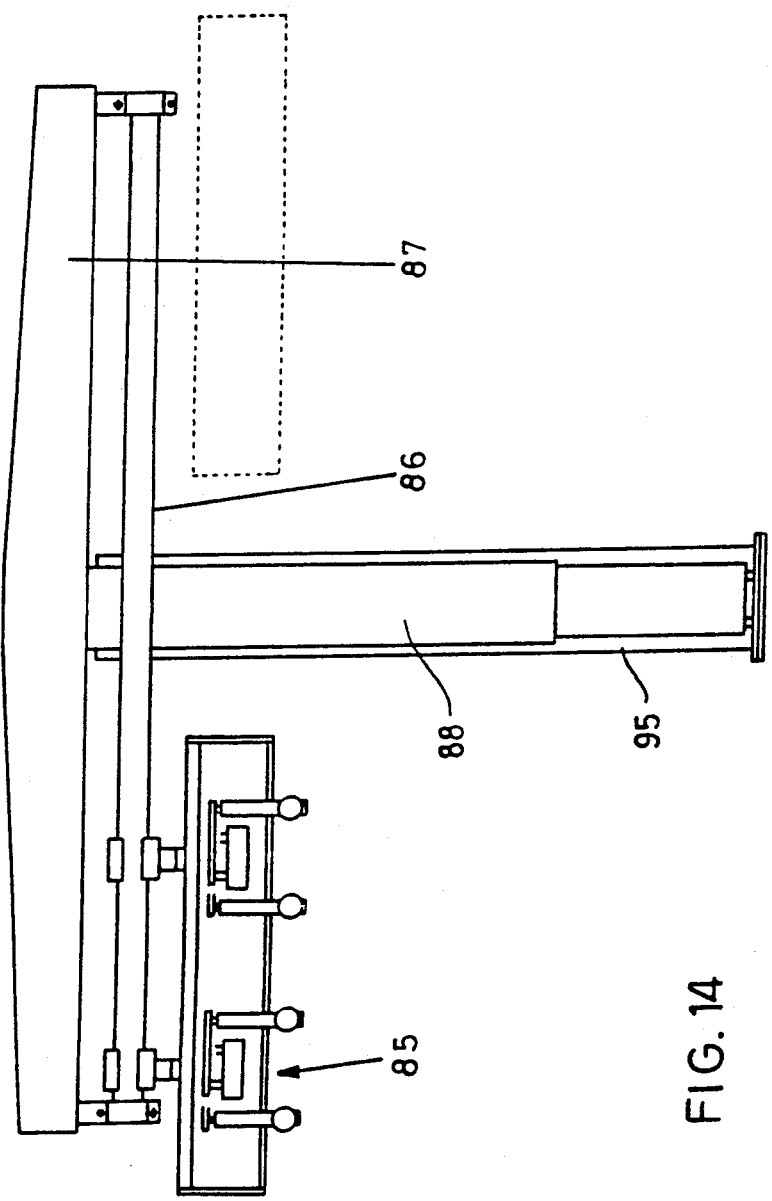
FIG. 14 is an elevational view showing the means to grip the containers with the meat piece from the first station to transfer to the third station.

FIG. 13 shows the cabin or enclosure 120 of upright laminar flow which surrounds the set of the three mentioned stations to guaranty that all the operations that are carried out sequentially, are achieved in a sterile atmosphere.

Lastly FIGS. 20 and 21 describe the mechanism to actuate the clamps 85 comprising pairs of slidable support pieces 101, 102, which are movable lengthwise along guide rod 103, 104 and connected through levers 105, 106 to diametrically opposed points of two rotatable discs 107, 108. One of the members of each pair or support pieces is attached to the stem of a fluid dynamic cylinder 109, 110 integral with a housing of the unit. As indicated by the arrows in FIG. 21, when one of the slidable support pieces is pushed the other support piece is also moved so that they move toward or away from each other to open or close the clamps 85.

The fluid dynamic actuators employed can be hydraulic or pneumatic depending on performances or the features of the plant.

I claim:

1. An automatic machine for sterilization and aseptic packaging of treated meat products which have been deboned, injected with additives, tenderized, cured and pasteurized, including being cooked inside a container in a protective wrapping means until reaching a temperature at the thermal center of said meat products of 65° C.-75° C. for a sufficient time for suitable meat product pasteurization which guarantees heating effects (value F 10° C.-70° C.) over 30, measured at said thermal center, said wrapping means being removed with elimination of exuded fluids, and external surface conditioning of said meat products, comprising:
    a first station for sterilizing said meat products;
    a second station for receiving said sterilized meat products from said first station for wrapping said sterilized meat products;
    a third station for sealing said containers adjacent said second station;
    means to feed said treated meat products to said first station;
    a tightly sealable chamber at said first station;
    means for receiving said treated meat products in said first station, holding said treated meat products in a stable position in said first station, and releasing said meat products;
    means for tightly sealing said chamber in said first station about said treated meat products and for opening said chamber after a pre-set time required for sterilization of said meat products;
    heating means for providing heat inside said chamber when tightly sealed in said first station for producing an internal atmosphere reaching an average temperature in the range from 100° C. to 160° C. for a treatment time less than 15 seconds for surface sterilization of said meat products;
    second transfer means comprising means for removing said surface sterilized meat products from said chamber when opened after sterilization in said first station, and means for transferring said surface sterilized meat products to said second station in a pre-set position for wrapping thereof;
    storage means for tubular containers in said second station;
    means for sequentially positioning said tubular containers from said storage means therefor to a position at said second station so that an inlet to each tubular container is adjacent and facing said meat products being transferred to said second station;
    means for opening said inlet of each tubular container in said second station and maintaining said inlet open by fixing the position of at least two walls of each tubular container;
    said means for transferring said meat products to said second station comprising pushing means for pushing said treated meat products from said second transfer means into said open inlets of said tubular containers;
    third transfer means for gripping and transferring said filled containers with said inlets thereof open from said second station to said third station;
    vacuum sealing means in said third station for sealing said inlets of said tubular containers;
    enclosure means around said first, second and third stations; and
    an ultrafilitrate air impulsion module means for providing a laminar upward flow in said enclosure means to assure a microorganism free atmosphere at said stations, said means being synchronized for sequential cyclic operation thereof.

2. The machine as claimed in claim 1 wherein:
    said first transfer means comprises a supporting floor having a capacity for at least two meat products; and
    said first, second and third transfer means, and said first, second and third stations are adapted to operate on at least two of said meat products simultaneously.

3. The machine as claimed in claim 1 wherein said first transfer means comprises:
    a frame;
    a plurality of parallel horizontal guides integral with said frame;

a holding truck having wheels rotatably mounted thereon and engaging with said horizontal guides for rolling guided movement thereon;

a plurality of longitudinal, co-planar, parallel and equally spaced strips each having one end secured to a transverse support member on said truck extending transversely to said strips so that said strips extend in cantilever fashion from said transverse support member;

a fixed strip supporting member of material having a low coefficient of friction integral with said frame and in spaced relationship to said transverse support member for slidably supporting said strips; and pulling means mounted on said frame and engaging said holding truck for reciprocating said holding truck along said horizontal guides and said strips slidingly over said fixed strip supporting member.

4. The machine as claimed in claim 3 wherein said pulling means comprises:

an inverted cross-sectional U-shaped member below and extending in a direction transverse to said spaced strips and attached to said truck for movement with said truck and said spaced strips;

two toothed wheels rotatably mounted on upright shafts in spaced relationship on said frame below said spaced strips;

a horizontal endless link chain extending between and operatively connected with said toothed wheels;

a motoreducer coupled to one of said toothed wheels for rotatably driving said toothed wheels and said link chain;

a T-shaped element having a transversal branch rotatably mounted on a stem depending from said branch, and a lower end portion on said stem having a C-shaped cross section engaging in embracing relationship a link of said link chain;

a pair of freely rotating wheels mounted on said transversal branch and engaging within said inverted U-shaped member for linear movement therein, so that operation of said motoreducer drives said toothed wheels and said chain which reciprocates said truck for transferring meat products on said spaced strips to said first station.

5. The machine as claimed in claim 1 wherein said first station comprises:

a bed frame;

an annular base plate base connected at the inner periphery thereof to a basin extending across a central opening in said annular base plate;

a plurality of equally spaced cut-outs in the outer periphery of said annular base plate base;

a circumferential groove in an upwardly facing surface of said annular base plate in adjacent spaced relationship with respect to said cut-outs;

a sealing gasket in said circumferential groove;

a rotatably movable ring encircling said outer periphery of said annular base plate and having a C-shaped cross section comprising upper and lower spaced annular ribs extending inwardly with respect to said annular base plate and in overlapping relationship with said periphery thereof so that said ring loosely slidably engages said annular base plate adjacent said periphery thereof;

a plurality of cut-outs in said upper annular rib in circumferential equally spaced relationship and equal in number to said cut-outs in said annular base plate;

a plurality of sets of ring support wheels rotatably mounted on said bed frame and engaging a lower surface and a peripheral outer surface on said movable ring for supporting said ring for rotational movement with respect to said bed frame; and a fluid operated cylinder-piston means having a cylinder body portion and a piston rod being connected to said bed frame and the other of said body portion and piston rod being connected to said rotatable ring so that operation of said fluid cylinder means reciprocally rotates said ring relative to said bed frame and to said annular base plate.

6. The machine as claimed in claim 5 and further comprising:

a supporting floor for said meat products disposed over said basin of said first station and formed by a grid comprising a plurality of narrow, rectangular cross-section elongated grid bars in parallel spaced relationship, said grid bars having a height greater than the height of said spaced strips of said first transfer means, the spaces between said grid bars being sufficient to receive said spaced strips slidably therebetween to facilitate transfer of said meat products from said first transfer device to said grid;

two spaced longitudinal grid support members below and attached to said grid bars for supporting and connecting said grid bars together to form said grid;

a pair of upwardly extending grid support stems each having upper ends connected to said grid support members and extending in slidably relationship through said basin and having lower ends connected to grid actuating bar means; and a fluid dynamic grid actuator comprised of a fluid operated cylinder and piston and a piston rod extendable from said cylinder, one of said cylinder and piston rod being connected to said grid actuating bar means and the other of said cylinder and piston rod being connected to said bed frame so that operation of said fluid dynamic actuator reciprocates said grid upwardly and downwardly.

7. The machine as claimed in claim 5 and further comprising:

a plurality of further elongated elements connected to said annular plate in spaced relationship below said grid bars and extending substantially transversely thereto; and a plurality of U-shaped cross section support elements on said further elongated members between adjacent grid bars, said U-shaped support elements being made of a low friction co-efficient material and positioned for receiving in said U thereof in sliding guiding relationship said spaced strips of said first transfer device for transfer of said meat products to said grid.

8. The machine as claimed in claim 5 and further comprising:

a removable cover means at said first station for providing said sealed chamber for sterilization of said meat products on said grid; and means for moving said cover means between an open position and a closed position.

9. The machine as claimed in claim 8 wherein said cover means comprises:

an annular cover plate engagable in overlying relationship with respect to said annular base plate in said closed position of said cover means and having an inner peripheral edge and an outer peripheral edge, said outer peripheral edge being engageable in said rotatable ring between said two annular ribs thereof;

a double-dome-shaped cover having an outer peripheral edge connected to said inner peripheral edge of said annular cover plate;

a plurality of cover operating stems extending upwardly in sliding relationship through said annular cover plate and having upper ends connected to said annular cover plate and lower ends interconnected by a cover actuating bar;

a plurality of spaced guide rollers rotatably mounted on said bed frame for laterally supporting and guiding said cover operating stems; and a fluid dynamic cover actuator comprising a cylinder part, a fluid operated piston in said cylinder part, and a piston rod extendable from said cylinder part, one of said cylinder and piston rod parts being connected to said bed frame and the other of said cylinder and piston rod parts being connected to said actuator bar, so that operation of said fluid dynamic cover actuator reciprocates said cover means upwardly to said open position and downwardly to said closed position of said cover means.

10. The machine as claimed in claim 9 wherein:
said fluid dynamic grid actuator for reciprocating said grid and said fluid dynamic cover actuator for reciprocating said cover means are arranged for operation in parallel with respect to each other.

11. The machine as claimed in claim 9 and further comprising:

a plurality of circumferentially spaced cut-outs in said outer peripheral edge of said annular cover plate having suitable dimensions and a number equal to the number of cut-outs in said rotatable ring so that said annular cover plate is insertable through said cut-outs in said rotatable ring for engagement therein between said annular ribs thereof when said rotatable ring is rotated into a position corresponding to said open position of said cover means; and circumferentially spaced wedge shaped elements on said upper rib of said rotatable ring engageable with said annular cover plate when inserted through said cut-outs in said ring in said closed position of said cover means for detachably locking said annular cover plate on said annular plate when said rotatable ring is rotated into a position corresponding to said closed position of said cover means.

12. The machine as claimed in claim 1 wherein:
said means for providing heat inside said chamber of said first station comprises nozzle means connectable to said chamber for supplying vapor at high temperature and pressure to said chamber and for removing said vapor from said chamber.

13. The machine as claimed in claim 1 wherein second transfer means comprises:
a second frame;
a plurality of second parallel horizontal guides integral with said second frame;
a second holding truck having wheels rotatably mounted thereon and engaging with said second horizontal guides for rolling guided movement thereon;
a plurality of second longitudinal, co-planar, parallel and equally spaced strips each having one end secured to a second transverse support member on said second truck extending transversely to said second strips so that said second strips extend in cantilever fashion from said second transverse support member;

a second fixed strip supporting member of material having a low coefficient of friction integral with said second frame and in spaced relationship to said second transverse support member for slidably supporting said second strips;

second pulling means mounted on said second frame and engaging said second holding truck for reciprocating said second holding truck along said second horizontal guides and said second strips slidingly over said second fixed strip supporting member;

an upper surface on each of said second strips; and a plurality of elongated freely rotatable cylinders coaxially mounted on said upper surfaces of said second strips in end to end spaced relationship in the longitudinal direction of said second strips.

14. The machine as claimed in claim 1 wherein:
a third frame is provided;
floor means is provided in said second station on said third frame substantially co-planar and adjacent to a transfer surface formed by said freely rotatable cylinders of said second transfer means;
a plurality of slots are provided in said floor means connected to a vacuum generating means; and
said means for sequentially positioning said tubular containers from said storage means to a position at said second station comprises a tilting head means, a plurality of suction cups mounted on said tilting head means for reciprocating movement relative to said tilting head means and engagable with at least two tubular containers simultaneously on said storage means for attaching said suction cups to said at least two tubular containers for removing said at least two tubular containers from said storage means, pivot support means for pivotally supporting said traveling head means on said third frame, and fluid-dynamic cylinder means pivotally mounted on said third frame and pivotally connected to said pivoting support means for moving said traveling head between a loading position over said storage means and an unloading position over said floor means for positioning said at least two bags on said slots in said floor means for retaining said containers thereof by said vacuum generating means when said traveling head is returned to said loading position.

15. A machine as claimed in claim 14 wherein:
said means for opening said inlet of each tubular container in said second station and maintaining said inlet open comprises a set of side blades and lower blades rotatably mounted on said third frame and engagable with said inlet of each of said tubular containers, and driving means for rotating said blades around their axis of rotation; and
third blade means mounted on said tilting head and engagable with said tubular containers for maintaining an upper side thereof in an open position.

16. A machine as claimed in claim 1 wherein:
said pushing means comprises an L-shaped member having one arm superimposed in parallel relationship over said second strips and said freely rotatable cylinders on said second strips, and a second arm connected to a pushing means fluid-dynamic actuator mounted on said third frame so that operation of said pushing means fluid-dynamic actuator moves said first arm over said freely rotatable cylinders for moving meat products on said second transfer device towards said second station.

17. The machine as claimed in claim 1 wherein said third transfer means comprises:
   an upwardly extending fixed column on a fourth frame;
   lifting and lowering means movably mounted on said fixed column for upwardly and downwardly reciprocating movement;
   a movable column connected to said lifting and lowering means;
   a substantially horizontal arm having a central portion connected to said movable column and end portions extending outwardly therefrom; and
   clamping means mounted for movement along said horizontal arm between said ends thereof.

18. The machine as claimed in claim 15 wherein said driving means comprises:
   two parallel spaced spindles rotatably mounted on said third frame and having first and second ends;
   a toothed wheel fixedly mounted on said first end of each of said spindles and interengaged with each other for simultaneous rotation;
   a driving crank means on one of said toothed wheels for rotating said toothed wheels;
   an intermediate elongated guide member between said spindles and extending parallel thereto and having ends mounted on said third frame;
   external screw threads on said spindles;
   a first pair of blade support members each having a first hole threadably engaging a first one of said spindles, a second hole slidably engaging a second one of said spindles, and a third hole slidably engaging said intermediate guide member;
   a second pair of blade support members each having a first hole slidably engaging said first one of said spindles, a second hole threadably engaging said second one of said spindles, and a third hole slidably engaging said intermediate guide member;
   a rotating lever pivotally mounted on each of said blade support members;
   a first bar member pivotally connected to said rotating levers on said first blade support members;
   a second bar member pivotally connected to said rotating levers on said second blade support members;
   a blade fluid-dynamic actuator comprised of a cylinder and piston means having a piston rod extendable from said cylinder, said cylinder being pivotally connected to one of said second blade support members and said piston rod being pivotally connected to said first bar member; and
   a side blade connected to each of said rotating levers for rotation therewith, so that operation of said blade fluid-dynamic actuator rotates said rotating levers and said blades connected thereto.

19. A machine as claimed in claim 15 wherein:
   each of said lower blades comprises an L-shaped plate having an elbowed portion on one end thereof;
   a rotatable shaft for said L-shaped plates is rotatably mounted on said third frame and fixedly connected to said elbowed portion of respective L-shaped plates;
   lever means are fixedly connected to said shaft for rotation therewith; and
   fluid-dynamic cylinder means is provided having a cylinder pivotally connected to said third frame and a piston operated stem extendable from said cylinder member having an outer end pivotally connected to said lever means so that operation of said fluid-dynamic actuator rotates said lever means and said L-shaped plates.

20. The machine as claimed in claim 17 wherein said lifting and lowering means comprises:
   an upright fluid-dynamic cylinder having a piston stem extendable from the upper end thereof;
   a pulley rotatably mounted at said upper end of said stem;
   a chain extending around said pulley and having a first end connected to said fixed column and a second end connected to said movable column; and
   means on said fixed column for slidably guiding said movable column so that operation of said upright fluid-dynamic means reciprocates said column upwardly and downwardly on said fixed column.

21. The machine as claimed in claim 17 and further comprising:
   a plurality of clamp actuating mechanisms, each mechanism comprising guide rods mounted on said horizontal arm, at least two pairs of clamp support elements slidably mounted on said guide rods, a clamp member on each clamp support element, a rotatable disk mounted on said horizontal arm between each pair of clamp support elements, a first link member having one end pivotally connected to one of said clamp support elements of each pair of said clamp support elements and a second end pivotally connected to said rotatable disk eccentric to the axis of rotation thereof, a second link member having one end pivotally connected to the other of said clamp support elements of each pair of clamp support elements and the other end pivotally connected to said rotatable disk eccentric to the axis of rotation thereof and diametrically opposite to the position of pivotal connection of said first link to said rotatable disk, and a clamp fluid-dynamic cylinder having a cylinder thereof pivotally connected to said rotatable disk eccentric to the axis of rotation thereof and a piston stem extendable from said cylinder having an outer end pivotally connected to a clamp mechanism housing member movable along said horizontal arm, so that operation of said clamp fluid-dynamic cylinder in one direction rotates a respective rotatable disk in a direction for drawing said clamp support elements of each pair of clamp support elements and clamp members thereon together into a clamping position, and operation of said clamp fluid-dynamic cylinder in the opposite direction rotates said respective rotatable disk in a direction to move said clamp support members of each pair of said clamp support members and said clamp members thereon away from each other into a non-clamping position.

22. The machine as claimed in claim 3 wherein said first station comprises:
   a bed frame;
   an annular base plate base connected at the inner periphery thereof to a basin extending across a central opening in said annular base plate;
   a plurality of equally spaced cut-outs in the outer periphery of said annular base plate base;

a circumferential groove in an upwardly facing surface of said annular base plate in adjacent spaced relationship with respect to said cut-outs;

a sealing gasket in said circumferential groove;

a rotatably movable ring encircling said outer periphery of said annular base plate and having a C-shaped cross section comprising upper and lower spaced annular ribs extending inwardly with respect to said annular base plate and in overlapping relationship with said periphery thereof so that said ring loosely slidably engages said annular base plate adjacent said periphery thereof;

a plurality of cut-outs in said upper annular rib in circumferential equally spaced relationship and equal in number to said cut-outs in said annular base plate;

a plurality of sets of ring support wheels rotatably mounted on said bed frame and engaging a lower surface and a peripheral outer surface on said movable ring for supporting said ring for rotational movement with respect to said bed frame; and a fluid operated cylinder-piston means having a cylinder body portion and a piston rod extendable therefrom, one of said body portion and piston rod being connected to said bed frame and the other of said body portion and piston rod being connected to said rotatable ring so that operation of said fluid cylinder means reciprocally rotates said ring relative to said bed frame and to said annular base plate.

23. The machine as claimed in claim 4 wherein said first station comprises:

a bed frame;

an annular base plate base connected at the inner periphery thereof to a basin extending across a central opening in said annular base plate;

a plurality of equally spaced cut-outs in the outer periphery of said annular base plate base;

a circumferential groove in an upwardly facing surface of said annular base plate in adjacent spaced relationship with respect to said cut-outs;

a sealing gasket in said circumferential groove;

a rotatably movable ring encircling said outer periphery of said annular base plate and having a C-shaped cross section comprising upper and lower spaced annular ribs extending inwardly with respect to said annular base plate and in overlapping relationship with said periphery thereof so that said ring loosely slidably engages said annular base plate adjacent said periphery thereof;

a plurality of cut-outs in said upper annular rib in circumferential equally spaced relationship and equal in number to said cut-outs in said annular base plate;

a plurality of sets of ring support wheels rotatably mounted on said bed frame and engaging a lower surface and a peripheral outer surface on said movable ring for supporting said ring for rotational movement with respect to said bed frame; and a fluid operated cylinder-piston means having a cylinder body portion and a piston rod extendable therefrom, one of said body portion and piston rod being connected to said bed frame and the other of said body portion and piston rod being connected to said rotatable ring so that operation of said fluid cylinder means reciprocally rotates said ring relative to said bed frame and to said annular base plate.

24. The machine as claimed in claim 22 and further comprising:

a supporting floor for said meet products disposed over said basin of said first station and formed by a grid comprising a plurality of narrow, rectangular cross-section elongated grid bars in parallel spaced relationship, said grid bars having a height greater than the height of said spaced strips of said first transfer means, the spaces between said grid bars being sufficient to receive said spaced strips slidably therebetween to facilitate transfer of said meat products from said first transfer device to said grid;

two spaced longitudinal grid support members below and attached to said grid bars for supporting and connecting said grid bars together to form said grid;

a pair of upwardly extending grid support stems each having upper ends connected to said grid support members and extending in slidably relationship through said basin and having lower ends connected to grid actuating bar means; and a fluid dynamic grid actuator comprised of a fluid operated cylinder and piston and a piston rod extendable from said cylinder, one of said cylinder and piston rod being connected to said grid actuating bar means and the other of said cylinder and piston rod being connected to said bed frame so that operation of said fluid dynamic actuator reciprocates said grid upwardly and downwardly.

25. The machine as claimed in claim 24 and further comprising:

a plurality of further elongated elements connected to said annular plate in spaced relationship below said grid bars and extending substantially transversely thereto; and a plurality of U-shaped cross section support elements on said further elongated members between adjacent grid bars, said U-shaped support elements being made of a low friction co-efficient material and positioned for receiving in said U thereof in sliding guiding relationship said spaced strips of said first transfer device for transfer of said meat products to said grid.

26. The machine as claimed in claim 25 and further comprising:

a removable cover means at said first station for providing said sealed chamber for sterilization of said meat products on said grid; and means for moving said cover means between an open position and a closed position.

* * * * *